United States Patent [19]

Labana et al.

[11] 3,976,719

[45] Aug. 24, 1976

[54] POWDER COATING COMPOSITIONS COMPRISING A BLEND OF COREACTIVE POLYMERS - II D

[75] Inventors: Santokh S. Labana, Dearborn Heights; Ares N. Theodore, Farmington, both of Mich.

[73] Assignee: Ford Motor Company, Dearborn, Mich.

[22] Filed: Aug. 21, 1975

[21] Appl. No.: 606,678

Related U.S. Application Data

[62] Division of Ser. No. 426,169, Dec. 19, 1973, Pat. No. 3,914,333.

[52] U.S. Cl. .............................. 260/836; 260/17 R; 260/31.8 E; 260/824 EP; 260/827; 260/830 R; 260/830 TW; 260/DIG. 16; 260/DIG. 17; 260/DIG. 18; 427/27; 526/303; 526/317; 526/320; 526/328
[51] Int. Cl.$^2$.......................................... C08L 63/00
[58] Field of Search ......................... 260/830 R, 836

[56] References Cited
UNITED STATES PATENTS

| | | | |
|---|---|---|---|
| 3,541,055 | 11/1970 | Malamet............................ | 260/834 |
| 3,730,930 | 5/1973 | Labana ............................. | 260/23 EP |
| 3,752,870 | 8/1973 | Labana ............................. | 260/836 |
| 3,758,632 | 9/1973 | Labana et al. .................... | 260/836 |
| 3,758,633 | 9/1973 | Labana et al. .................... | 260/836 |
| 3,770,848 | 11/1973 | Labana et al. .................... | 260/836 |
| 3,781,379 | 12/1973 | Theodore et al. ................. | 260/836 |
| 3,781,380 | 12/1973 | Labana et al. .................... | 260/836 |
| 3,787,521 | 1/1974 | Labana et al. .................... | 260/836 |
| 3,876,587 | 4/1975 | Matsui ............................... | 260/836 |
| 3,932,320 | 1/1976 | Camelon et al. .................. | 260/836 |
| 3,932,347 | 1/1976 | Camelon et al. .................. | 260/42.14 |
| 3,932,348 | 1/1976 | Camelon et al. .................. | 260/42.14 |
| 3,932,367 | 1/1976 | Labana et al. .................... | 260/78.4 D |
| 3,941,731 | 3/1976 | Camelon et al. .................. | 260/836 |

*Primary Examiner*—Paul Lieberman
*Attorney, Agent, or Firm*—Olin B. Johnson; Keith L. Zerschling

[57] ABSTRACT

Powder coating compositions are disclosed which comprise a blend of coreactable, thermosettable copolymers each of which have at least two different functional groups. Ordinarily, these polymers will be qualitatively difunctional, although they may contain more than two different functional groups, and quantitatively polyfunctional. At least one of the copolymers has epoxy functionality as one of its two or more different functionalities. Thus, in the preferred embodiments, the first copolymer of the blend has epoxy functionality and a second functionality selected from amide functionality, anhydride functionality and hydroxy functionality and is crosslinkable with the second copolymer through at least two different types of functional groups on the first copolymer. The second copolymer also is crosslinkable with the first copolymer though at least two different types of functional groups on the second copolymer and may be (a) anhydride functional and carboxy functional, (b) carboxy functional and amide functional, (c) carboxy functional and hydroxy functional, (d) epoxy functional and amide functional or (e) epoxy functional and anhydride functional. The second copolymer is advantageously employed in an amount such that its functionality of greatest concentration provides about 0.3 to about 1.2 functional groups per functional group on the first copolymer and the functionality of lesser concentration provides about 0.1 to about 0.4 functional groups per functional group on the first copolymer.

1 Claim, No Drawings

POWDER COATING COMPOSITIONS COMPRISING A BLEND OF COREACTIVE POLYMERS - II D

This is a division of application Ser. No. 426,169, filed Dec. 19, 1973, now U.S. Pat. No. 3,914,333.

BACKGROUND OF THE INVENTION

Powder coating compositions are extremely desirable for use in painting substrates in that they are essentially free of organic solvents conventionally utilized in liquid paint systems. Thus, they give off little, if any, volatile material to the environment when heat cured.

Powder coatings comprising (1) an epoxy-functional and hydroxy-functional copolymer, (2) a monomeric anhydride or a homopolymer of a monomeric anhydride, and (3) a hydroxy carboxylic acid have been described in U.S. patent application Ser. No. 394,876, filed Sept. 6, 1973 by A. N. Theodore, a coinventor herein, E. C. Siwiec and H. Van Oene. Powder coating compositions comprising (1) an epoxy-functional copolymer and (2) an anhydride crosslinking agent have been described heretofore in our copending U.S. patent application Ser. No. 172,224, filed Aug. 16, 1971; in U.S. Pat. No. 3,758,632; in U.S. patent application Ser. No. 394,887, filed Sept. 6, 1973 by A. N. Theodore, a coinventor herein, E. C. Siwiec and H. Van Oene, in U.S. patent application Ser. No. 394,878, filed Sept. 6, 1973 by A. N. Theodore, a coinventor herein, E. C. Siwiec and H. Van Oene, in our U.S. patent application Ser. No. 394,879, filed Sept. 6, 1973; in U.S. patent application Ser. No. 394,880, filed Sept. 6, 1973 by S. S. Labana, a coinventor herein, and S. C. Peng and in our U.S. patent application Ser. No. 394,881, filed Sept. 6, 1973. Powder coating compositions comprising (1) an epoxy-functional, hydroxy-functional copolymer and (2) a dicarboxylic acid crosslinking agent are disclosed in our U.S. patent application Ser. No. 394,874 filed Sept. 6, 1973. Powder coating compositions comprising (1) an epoxy-functional, amide-functional copolymer and (2) a carboxy terminated polymer, e.g., a carboxy terminated polyester, are disclosed in U.S. patent application Ser. No. 394,875 filed Sept. 6, 1973 by J. D. Nordstrom and S. C. Peng.

In the preparation, storage and use of powder coating compositions a variety of problems arise which are either peculiar to powder coating materials or are common to other forms of coating but differ in degree or form in powder coating materials. These include lack of component compatibility, i.e., phase separation, resistance to pigment dispersion, caking, etc. For example, both monomeric anhydrides and homopolymers of monomeric anhydrides, e.g., poly (azelaic anhydride) and poly (adipic anhydride), make effective crosslinking agents for suitable copolymers, e.g., epoxy-functional copolymers. Care must be exercised, however, in the preparation and use of such coating compositions in that monomeric anhydrides tend to sublime during processing and powders containing polyanhydrides of the type above described have a tendency to cake.

THE INVENTION

The problems associated with many powder coating compositions are avoided or reduced by employing as the reactive ingredients an intimate blend of coreactable, thermosettable copolymers each of which have at least two different functional groups. In most embodiments, these copolymers will be qualitatively difunctional, although they may contain more than two different functional groups, and quantitatively polyfunctional. At least one of the copolymers has epoxy functionality as one of its two or more different functionalities. Thus, the first copolymer of the blend has epoxy functionality and a second functionality selected from amide functionality, anhydride functionality and hydroxy functionality and is crosslinkable with the second copolymer through at least two different types of functional groups on the first copolymer. The second copolymer also is crosslinkable with the first copolymer through at least two different types of functional groups on the second copolymer and may be (a) anhydride functional and carboxy functional, (b) carboxy functional and amide functional, (c) carboxy functional and hydroxy functional, (d) epoxy functional and amide functional or (e) epoxy functional and anhydride functional. The second copolymer is advantageously employed in an amount such that its functionality of greatest concentration provides about 0.3 to about 1.2 functional groups per functional group on the first copolymer and the functionality of lesser concentration provides about 0.1 to about 0.4 functional group per functional group on the first copolymer.

These copolymers have a glass transition temperature in the range of 40° to 90°C., preferably between 50° and 80°C., and a molecular weight ($\bar{M}_n$) in the range of about 1500 to about 15,000, preferably about 2500 to about 6000.

The powder coating compositions of this invention demonstrate excellent component capability, suitability for effective pigment dispersion and resistance to caking.

DETAILED DESCRIPTION OF THE INVENTION

The copolymers employed in the powder coating compositions of this invention are readily formed by conventional free radical induced polymerization of the olefinically unsaturated monomers employed. Generally, a free radical initiator is needed to induce the polymerization reaction. A large number of free radical initiators are known to the art and are suitable for this purpose. These include benzoyl peroxide, lauryl peroxide, t-butylhydroxy peroxide, acetylcyclohexane sulfonyl peroxide, diisobutyrl peroxide, di- (2-ethylhexyl) peroxydicarbonate, diisopropyl peroxydicarbonate, t-butyl peroxypivalate, decanoyl peroxide, azobis (2-methylpropionitrile), etc. The polymerization is preferably carried out in solution using a solvent in which the copolymer is soluble. Toluene, xylene, dioxane, butanone and others are suitable solvents for these polymerizations.

The preparation of these copolymers can be illustrated with the epoxy-functional, hydroxy-functional copolymer. This copolymer advantageously contains about 5 to about 20, preferably about 8 to about 15, weight percent of a glycidyl ester of a monoethylenically unsaturated acid, e.g., glycidyl acrylate or glycidyl methacrylate, about 2 to about 10, preferably about 3 to about 6, weight percent of a hydroxyacrylate, e.g. a monohydroxy ester of a $C_2 - C_4$ diol and acrylic or methacrylic acid, and about 70 to about 93, preferably about 79 to about 89, weight percent of monoethylenically unsaturated, quantitatively and qualitatively monofunctional monomers. A monoethylenically unsaturated monomer that is both qualitatively and quantitatively monofunctional has as its sole operative functionality its one olefinic unsaturation group, e.g., styrene, methyl methacrylate, etc.

The monoethylenically unsaturated, qualitatively and quantitatively monofunctional monomers are preferably monomers having alpha-beta olefinic unsaturation. These can be acrylates or a mixture of acrylates and monovinyl hydrocarbons. Preferably, in excess of fifty (50) weight percent of the copolymer monomers are esters of a $C_1 - C_8$ monohydric alcohol and acrylic or methacrylic acid, i.e., methyl methacrylate, ethyl acrylate, butyl acrylate, hexyl acrylate, and 2-ethylhexyl methacrylate. $C_8 - C_9$ monovinyl hydrocarbons such as styrene, alpha methyl styrene, vinyl toluene, t-butyl styrene, and chlorostyrene are typical of the vinyl hydrocarbons and substituted vinyl hydrocarbons which are suitable for this purpose.

If the epoxy-functional, hydroxy-functional copolymer is prepared in solution, the solid copolymer can be precipitated by pouring the solution at a slow rate into a non-solvent for such copolymer as hexane, octane or water under suitable agitation conditions. The copolymer thus obtained is further dried so that it contains less than about three percent of the materials that volatilize at the temperatures used for baking the coatings.

These copolymers can also be prepared by emulsion polymerization, suspension polymerization, bulk polymerization or their suitable combinations. In these methods of preparing the copolymer, chain transfer agents may be required to control the molecular weight of the copolymer to a desired range. The solid copolymers obtained by these methods must also be dried to contain less than about three percent of the materials that volatilize at the temperatures used for baking the coatings.

For powder coating applications, both molecular weight and molecular weight distribution of the copolymer are important. While the molecular weight ($\overline{M}_n$) range extends from about 1500 to about 15,000, the copolymer component must not contain significant amounts of higher molecular weight fractions. No more than five (5) percent of the copolymer should be of molecular weight greater than 20,000. The molecular weight distribution as measured by the ratio of weight average to number average molecular weight ($M_w/M_n$) should be in the range of 1.6 to 3.0. The preferred range of molecular weight distribution is in the range of 1.7 to 2.2.

With the appropriate monomers, hereinafter described and illustrated, the other copolymers used in the powder coating compositions of this invention can be prepared by the same methods heretofore described to prepare the epoxy-functional, hydroxy-functional copolymer. Minor adjustments in temperature, solvents, initiator, etc. may be made to optimize the preparation of a given copolymer but these are all within the day to day working skills of one skilled in the art.

The other embodiments of what has been termed the first copolymer of the blend include epoxy-functional, amide-functional copolymers and epoxy-functional anhydride-functional copolymers.

The epoxy-functional, amide-functional copolymers advantageously contains about 5 to about 20, preferably about 8 to about 15, weight percent of a glycidyl ester of a monoethylenically unsaturated acid, about 2 to about 10, preferably about 3 to about 6, weight percent of an alpha-beta olefinically unsaturated amide, e.g., acrylamide and methacrylamide, and about 70 to about 93, preferably about 79 to about 89 weight percent of monoethylenically unsaturated, quantitatively and qualitatively monofunctional monomers.

The epoxy-functional, anhydride-functional copolymer advantageously contains about 5 to about 20, preferably about 8 to about 15, weight percent of a glycidyl ester of a monoethylenically unsaturated acid, about 2 to about 10, preferably about 3 to about 6, weight percent of an anhydride of an olefinically unsaturated dicarboxylic acid, and about 70 to about 93, preferably about 79 to about 89, weight percent of monoethylenically unsaturated, quantitatively and qualitatively monofunctional monomers. Suitable anhydrides include maleic anhydride, itaconic anhydride, dichloromaleic anhydride, dodecenyl succinic anhydride, tetrahydrophthalic anhydride, etc.

The second copolymer is selected from copolymers which have two different functional groups that will react with different functional groups on the first copolymer. In some embodiments, there may be one functional group on the first or second copolymer which will react with two or more different functional groups on the other while its companion functional group will react with only one of the functional groups on the other copolymer. In other embodiments, there will be one functional group on the first or second copolymer that will react with only one kind of functional group on the other copolymer while its companion will react only with another kind of functional group on the other copolymer.

The composition of the preferred second copolymers are hereinafter set forth.

The anhydride-functional, carboxy-functional second copolymer wherein the anhydride functionality is in higher concentration advantageously contains about 5 to about 20, advantageously about 8 to about 15, weight percent of an anhydride of an olefinically unsaturated dicarboxylic acid, preferably an alpha-beta olefinically unsaturated dicarboxylic acid, about 2 to about 10, preferably about 3 to about 6, weight percent of an alpha-beta olefinically unsaturated monocarboxylic acid, e.g., acrylic acid and methacrylic acid, and about 70 to about 93, preferably about 79 to about 89, weight percent of monoethylenically unsaturated, quantitatively and qualitatively monofunctional monomers.

The anhydride-functional, carboxy-functional second copolymer in which the carboxy functionality is in higher concentration advantageously has the same composition as that where the anhydride concentration predominates except that the concentration ranges for the olefinically unsaturated anhydride and for the alpha-beta olefinically unsaturated monocarboxylic acid are reversed.

The carboxy-functional, amide-functional second copolymer advantageously comprises about 5 to about 20, preferably about 6 to about 15, weight percent of an alpha-beta olefinically unsaturated monocarboxylic acid, about 2 to about 10, preferably about 3 to about 6, weight percent of an alpha-beta olefinically unsaturated amide, and about 70 to about 93, preferably about 79 to about 91, weight percent of monoethylenically unsaturated, quantitatively and qualitatively monofunctional monomers.

The carboxy-functional and hydroxy-functional second copolymer advantageously comprises about 5 to about 20, preferably about 6 to about 15, weight percent of an alpha-beta olefinically unsaturated monocarboxylic acid, about 2 to about 10, preferably about 3 to about 6, weight percent of a hydroxy acrylate, and about 70 to about 13, preferably about 79 to about 91, weight percent of monoethylenically unsaturated, quantitatively and qualitatively monofunctional monomers.

The epoxy-functional and amide-functional second copolymer advantageously has the same composition as the epoxy-functional and amide-functional first copolymer hereinbefore described.

The epoxy-functional, anhydride-functional second copolymer advantageously has the same composition as the epoxy-functional and anhydride-functional first copolymer hereinbefore described.

These powder coating compositions advantageously contain a flow control agent as a part of the powder coating mixture. The flow control agent is a polymer having a molecular weight ($\bar{M}_n$) of at least 1000 and advantageously comprises between 0.05 and 4.0 weight percent of the mixture. The flow control agent has a glass transition temperature at least 20°C. below the glass transition temperature of each of the copolymers.

One group of suitable flow control agents are acrylic polymers. Preferred acrylic polymers which may be used for flow control agents are polylauryl acrylate, polybutyl acrylate, poly (2-ethylhexyl acrylate), polylauryl methacrylate and polyisodecyl methacrylate. These advantageously have molecular weights in the range of about 3000 to about 20,000, preferably about 4000 to about 15,000.

The flow control agent may also be a fluorinated polymer having a surface tension, at the baking temperature of the powder, lower than that of the copolymers used in the mixture. Preferred flow control agents, if the agent is a fluorinated polymer are esters of polyethyleneglycol or polypropyleneglycol and fluorinated fatty acids. For example, an ester of polyethyleneglycol of molecular weight of over 2500 and perfluoro octanoic acid is a useful flow control agent. Polymeric siloxanes of molecular weight of over 1000 (advantageously 1000 to 20,000) may also be used, e.g., polydimethyl siloxane or polymethylphenyl siloxane.

A coating composition formed in accordance with the teachings of this invention may include a small weight percent of a catalyst in order to increase the crosslinking rate of the powder coating composition at the baking temperature thereof. Baking temperatures will ordinarily be in the range of 130° to 200°C. and the catalyst should produce a gel time for the powder coating composition at the baking temperature to be used which is at least 1 minute but no greater than 20 minutes. This gel time is preferably between about 2 and about 9 minutes at the baking temperature.

Some catalysts which are suitable for use in the powder coating compositions include tetraalkylammonium salts, imidazole type catalyst, tertiary amines and metal salts of organic carboxylic acids. The tetraalkylammonium salt catalysts include the following: tetrabutyl ammonium chloride (bromide or iodide), tetraethyl ammonium chloride (bromide or iodide), trimethylbenzylammonium chloride, dodecyl dimethyl (2-phenoxyethyl) ammonium bromide, diethyl (2-hydroxy ethyl) methyl ammonium bromide. Suitable catalysts of the imidazole type include: 2-methyl-4-ethyl imidazole, 2-methyl imidazole, imidazole, 2-[(N-benzylanilino) methyl] - 2-imidazoline phosphate, and 2-benzyl - 2-imidazoline hydrochloride. Suitable tertiary amine catalysts for the powder coating compositions of this invention include: triethylenediamine, N,N - diethylcyclohexylamine, and N-methyl morpholine. The metal salts of organic carboxylic acid which are catalysts for the powder coatings of this invention include, but are not limited to: stannous octoate, zinc naphthenate, cobalt naphthenate, zinc octoate, stannous 2-ethylhexoate, phenylmercuric propionate, lead neodecanoate, dibutyl tin dilaurate and lithium benzoate.

The catalyst used in an individual powder coating composition is generally solid at room temperature and has a melting point of from 50° to 200°C.

Conventional non-metallic and metallic pigments can be used with these powder coating compositions. Such are conventionally employed in an amount such as to constitute between about 6 and about 35 weight percent of the total mixture depending on the pigment selected and the gloss required for the baked coating.

Since individual powder coating compositions of this invention can be applied to an article to be painted by electrostatic methods, one may desire to include a small weight percentage of an antistatic agent in such compositions. In particular, the antistatic agent is included in a range from 0.05 weight percent of the total powder composition. Suitable antistatic agents include, but are not limited to, tetraalkylammonium salts as discussed previously and which also serve as catalysts. Other suitable antistatic agents include: alkylpoly (ethyleneoxy) phosphate or alkyllauryl poly (ethyleneoxy) phosphate; polyethyleneimine, poly (2-vinyl pyrollidone), pyridinium chloride, poly (vinyl pyridium chloride), polyvinyl alcohol or inorganic salts.

A plasticizer may be used in a powder coating composition of this invention if desired. The type of plasticizers used very often include adipates, phosphates, phthalates, sebacates, polyesters derived from adipic acid or azelaic acid, and epoxy or epoxidized plasticizers. Some of these plasticizers are: dihexyl adipate, diisooctyl adipate, dicyclohexyl adipate, triphenylphosphate, tricresylphosphate, tributylphosphate, dibutylphthalate, dioctylphthalate, butyl octyl phthalate, dioctyl sebacate, butyl benzyl sebacate, dibenzyl sebacate, butanediol - 1,4 - diglycidyl ether, diglycidyl ether of bisphenol A and its polymers and cellulose acetate butyrate.

Except in those instances herein wherein a specific compound is named, the term "acrylate" is used to include esters of both acrylic and methacrylic acid, i.e., acrylates and methacrylates.

The term "alpha-beta" unsaturation as used herein includes both the olefinic unsaturation that is between two carbon atoms which are in the alpha and beta positions relative to an activating group such as a carboxyl group, e.g., the olefinic unsaturation of maleic anhydride, and the olefinic unsaturation between the two carbon atoms which are in the alpha and beta positions with respect to the terminus of an aliphatic carbon-to-carbon chain, e.g., the olefinic unsaturation of acrylic acid or styrene.

Having described the various materials which are employed in formulating the powder coating compositions of this invention, a plurality of examples are hereinafter set forth to illustrate various individual powder coating compositions.

EXAMPLE 1

An epoxy-functional, hydroxy-functional copolymer is prepared from the below listed components in the manner hereinafter described:

| Reactants | Amounts, gms. | Percentage By Weight |
|---|---|---|
| glycidyl methacrylate | 30 | 15 |
| butyl methacrylate | 84 | 42 |
| styrene | 10 | 5 |
| methyl methacrylate | 66 | 33 |
| hydroxyethyl methacrylate | 10 | 5 |

The above listed monomers are admixed and 2,2' - Azobis - (2 - methylpropionitrile), hereinafter called AIBN, in the amount of 12.0 grams (6% based on combined weights of reactants) is added to the monomer mixture. The solution is added to the monomer mixture. The solution is added dropwise over a 2 hour period into 200 ml. toluene at 90° – 110°C. under nitrogen atmosphere. Then 0.2 grams of AIBN dissolved in 15 mls. of acetone are added over ½ hour period and refluxing is continued for three additional hours.

The prepolymer solution is diluted with 200 ml. acetone and coagulated in 2 liters of hexane. The white powder is dried in a vacuum oven for 24 hours at 55°C. The molecular weight of this copolymer is $M_w/M_n = 5560/3110$ and its Tg is 57°C.

An anhydride-functional, carboxy-functional copolymer is prepared from the below listed components in the manner hereinafter described:

| Reactants | Amount, grms. | Percentage By Weight |
|---|---|---|
| maleic anhydride | 16 | 8 |
| methacrylic acid | 6 | 3 |
| butyl methacrylate | 100 | 50 |
| styrene | 14 | 7 |
| methyl methacrylate | 64 | 32 |

The above listed monomers are admixed and AIBN in the amount of 12 grams (6% based on combined weights of reactants) is dissolved in 40 ml. of acetone and added to the monomer mixture. The solution is added into 200 ml. toluene at 80° – 95°C. under nitrogen atmosphere. Then 0.2 gram of AIBN dissolved in 5 ml. acetone is added over a one-half hour period and refluxing is continued for an additional 3 hours.

This copolymer is isolated and dried. Its molecular weight $M_w/M_n = 5450/3180$ and its Tg is 56°C.

The epoxy-functional, hydroxy-functional copolymer in the amount of 25.0 grams and the anhydride-functional, carboxy-functional copolymer in the amount of 25.0 grams are combined with the following ingredients:

| | |
|---|---|
| titanium dioxide | 6.0 |
| Ferrite Yellow | 5.5 |
| poly (2-ethylhexyl acrylate)$M_n$=9,000 | 0.43 |
| tetrabutylammonium iodide | 0.05 |

All components are ball-milled for four hours and mill-rolled for 5 minutes at 125°C. The material is granulated and pulverized to the desired particle size (20 microns in average major axis). It is a free flowing powder.

The powder is electrostatically sprayed on steel panels with an electrostatic spray gun for powder operating at 50 KV charging voltage.

After electrostatic deposition of powder on steel panels, it is cured at 160°C. for 30 minutes. The resulting coatings have good appearance, adhesion and good resistance to organic solvents, i.e., xylene, methyl ethyl ketone and gasoline.

EXAMPLE 2

A carboxy-functional, hydroxy-functional copolymer is prepared from the below listed components in the manner hereinafter described:

| Reactants | Amount, grms. | Percentage By Weight |
|---|---|---|
| methacrylic acid | 16 | 8 |
| hydroxyethyl methacrylate | 6 | 3 |
| butyl methacrylate | 110 | 55 |
| styrene | 10 | 5 |
| methyl methacrylate | 58 | 29 |

The above listed monomers are admixed and AIBN in the amount of 12.0 grams is added to the monomer mixture. The solution is added dropwise to 200 ml. of p-dioxane. The polymerization is carried out as in preparation of the epoxy-functional, hydroxy-functional copolymer of Example 1. The copolymer is isolated and dried. Its molecular weight $M_w/M_n = 5600/3210$ and its Tg is 57°C.

An epoxy-functional, anhydride-functional copolymer is prepared from the below listed components in the manner hereinafter described:

| Reactants | Amounts, gms. | Percentage By Weight |
|---|---|---|
| glycidyl methacrylate | 30 | 15 |
| maleic anhydride | 6 | 3 |
| butyl methacrylate | 84 | 42 |
| styrene | 10 | 5 |
| methyl methacrylate | 70 | 35 |

The amount of initiator, polymerization conditions (with the exception of reaction temperature range which here is 80° – 100°C.) is the same as used in the preparation of the epoxy-functional, hydroxy-functional copolymer of Example 1. The copolymer is isolated and dried. The molecular weight of the dry polymer is $M_w/M_n = 5450/3180$ and its Tg is 57°C.

The carboxy-functional, hydroxy-functional copolymer in the amount of 25.0 grams and the epoxy-functional, anhydride-functional copolymer in the amount of 22.0 grams are combined with the following ingredients:

| | Grams |
|---|---|
| titanium dioxide | 10.00 |
| poly (2-ethyl hexyl acrylate) | 0.45 |
| tetrabutylammonium bromide | 0.04 |

After ball-milling all components for 10 hours, they are mill-rolled for 5 minutes at 130°C. The pulverized powder (10 – 30 microns) is free flowing at room temperature, i.e. 20°–25°C.

The powder is electrostatically sprayed on steel panels and is cured at 165°C. for 20 minutes. The pigmented films have good gloss and good adhesion to metal.

EXAMPLE 3

An epoxy-functional, amide-functional copolymer is prepared from the below listed components in the manner hereinafter described:

| Reactants | Amounts, gms. | Percentage By Weight |
|---|---|---|
| glycidyl methacrylate | 30.0 | 15 |
| methacrylamide | 10.0 | 5 |
| butyl methacrylate | 80.0 | 40 |
| styrene | 10.0 | 5 |
| methylmethacrylate | 70.0 | 35 |

The amount of initiator and polymerization conditions are the same as those used in the preparation of the epoxy-functional, hydroxy-functional copolymer of Example 1. The copolymer is isolated and dried.

A carboxy-functional, anhydride-functional copolymer is prepared from the below listed components in the manner hereinafter described:

| Reactants | Amounts, gms. | Percentage By Weight |
|---|---|---|
| methacrylic acid | 16 | 8 |
| maleic anhydride | 6 | 3 |
| butyl methacrylate | 86 | 43 |
| styrene | 14 | 7 |
| methylmethacrylate | 78 | 39 |

The amount of initiator and polymerization conditions are those used for preparation of the carboxy-functional, hydroxy-functional copolymer in Example 2. The copolymer is isolated and dried. Its molecular weight is $M_w/M_n=5600/3185$ and its Tg is 56°C.

The epoxy-functional, amide-functional copolymer in the amount of 25.0 grams and the carboxy-functional, anhydride-functional copolymer in the amount of 25.0 grams are combined with the following ingredients:

| | Grams |
|---|---|
| titanium dioxide | 5.5 |
| Ferrite Yellow | 5.0 |
| poly (2-ethylhexylacrylate) | 0.45 |
| tetrabutylammonium chloride | 0.04 |

The above mixture is processed as in Example 1 and pulverized to the desired particle size (10 – 30 microns). The powder is electrostatically sprayed on grounded steel panels and cured at 160°C. for 30 minutes.

The cured coatings are glossy and smooth.

EXAMPLE 4

An anhydride-functional, epoxy-functional copolymer is prepared from the below listed components in the manner hereinafter described.

| Reactants | Amounts, grms. | Percentage By Weight |
|---|---|---|
| maleic anhydride | 16 | 8 |
| glycidyl anhydride | 10 | 5 |
| butyl methacrylate | 96 | 48 |
| styrene | 14 | 7 |
| methyl methacrylate | 64 | 32 |

The amount of initiator and polymerization conditions are those used for preparation of the carboxy-functional, anhydride-functional copolymer of Example 1. The copolymer is isolated and dried. Its molecular weight is $M_w/M_n=5600/3200$ and its Tg is 56°C.

The epoxy-functional, amide-functional copolymer of Example 3 in the amount of 25.0 grams and 28.0 grams of the above described anhydride-functional, epoxy-functional copolymer are combined with the following ingredients:

| | Grams |
|---|---|
| titanium dioxide | 5.5 |
| Ferrite Yellow | 5.0 |
| poly (2-ethyl hexyl acrylate) | 0.47 |
| tetraethylammonium iodide | 0.04 |

All the above ingredients are combined with 150 ml. acetone-methylene chloride solvent mixture (2:1 by volume) and ball-milled for 15 hours. After evaporation of the solvent mixture in a vacuum oven at room temperature, the powder is converted to the desired particle size (5–20 microns) with a fluid energy mill. The powder is free flowing.

The powder is sprayed electrostatically on grounded steel panels as in the preceding examples and cured at 170°C. for 30 minutes.

The cured coatings had good appearance and hardness. This powder coating when applied to other substrates such as glass, zinc, aluminum, copper and bronze and cured thereon, demonstrates good adhesion to such substrates. These coatings are not soluble in xylene, toluene, methyl ethyl ketone or gasoline.

EXAMPLE 5

A powder coating composition is prepared by combining 25.0 grams of the epoxy-functional, amide-functional copolymer of Example 3 and 25.0 grams of the carboxy-functional, hydroxy-functional copolymer of Example 2 are combined with the following ingredients:

| | Grams |
|---|---|
| titanium dioxide | 6.0 |
| Phthalocyanine Blue | 4.5 |
| poly (2-ethylhexyl acrylate) | 0.47 |
| tetraethylammonium bromide | 0.04 |

All of the above ingredients are ball-milled for 5 hours and mill-rolled for 5 minutes at 135°C. The material is granulated and pulverized to the desired particle size (20 microns).

After electrostatic deposition of the powder on grounded steel panels, it is cured at 160°C. for 30 minutes. The resulting coatings have good appearance, good adhesion and good solvent resistance.

EXAMPLE 6

A carboxy-functional, amide-functional copolymer is prepared from the below listed components in the manner hereinafter described:

| Reactants | Amounts, grms. | Percentage By Weight |
|---|---|---|
| methacrylic acid | 16 | 8 |
| methacrylamide | 6 | 3 |
| butyl methacrylate | 110 | 55 |
| styrene | 10 | 5 |
| methylmethacrylate | 58 | 29 |

The amount of initiator and polymerization conditions are similar to those used to prepare the carboxy-functional, hydroxy-functional copolymer of Example 2. The copolymer is isolated and dried.

A powder coating composition is prepared by combining 25.0 grams of the epoxy-functional, hydroxy-functional copolymer of Example 1 and 27.0 grams of the carboxy-functional, amide-functional copolymer of this example with the following ingredients:

|  | Grams |
|---|---|
| poly (2-ethylhexyl acrylate) | 0.48 |
| Ultramarine Blue | 5.00 |
| titanium dioxide | 7.00 |
| tetraethylammonium chloride | 0.04 |
| diepoxide (Epichlorohydrin-Bisphenol A type, Av. mol. wt. = 900, WPE = 500) | 2.00 |

The above components are ball-milled for 4 hours. Then they are combined with 150 ml. acetone-methylene chloride solvent mixture (2:1 by volume) and ball-milled for 15 hours. After evaporation of solvent and pulverization of powder to a particle size range of 10 – 30 microns. This powder is electrostatically sprayed on steel panels and baked at 170°C. for 25 minutes.

The glossy coatings obtained have good adhesion to steel and good impact strength. These coatings demonstrate good solvent resistance to toluene, xylene, methyl ethyl ketone and gasoline.

EXAMPLE 7

The procedure of Example 1 is repeated with the differences that (1) the epoxy-functional, hydroxy-functional copolymer is prepared using the following constituent monomers and AIBN in the amount of 0.7% based on combined weight of reactants:

| Reactants | Percentage By Weight |
|---|---|
| glycidyl methacrylate | 5 |
| butyl methacrylate | 42 |
| styrene | 5 |
| methyl methacrylate | 43 |
| hydroxyethyl methacrylate | 5 | and (2) the carboxy-functional, anhydride-functional copolymer is prepared using the following constituent monomers and AIBN in the amount of 0.7% based on combined weight of reactants:

| Reactants | Percentage By Weight |
|---|---|
| maleic anhydride | 4 |
| methacrylic acid | 3 |
| butyl methacrylate | 50 |
| styrene | 7 |
| methyl methacrylate | 32 |

This produces copolymers near the upper limit of the claimed molecular weight range.

The coatings obtained upon steel substrates after curing have good appearance and flexibility.

EXAMPLE 8

The procedure of Example 1 is repeated except for the differences that in preparing each of the copolymers therein, i.e., the epoxy-functional, hydroxy-functional copolymer and the carboxy-functional, anhydride-functional copolymer, the amount of AIBN used is equal to 7% based on the combined weight of reactants for that particular copolymer. This produces copolymers near the lower limit of the claimed molecular weight range. The coatings obtained on steel substrates after curing have good appearance and good adhesion.

EXAMPLE 9

The procedure of Example 1 is repeated except for the differences (1) that the composition of the epoxy-functional, hydroxy-functional copolymer is as follows:

| Reactants | Percentage By Weight |
|---|---|
| glycidyl methacrylate | 8 |
| butyl methacrylate | 40 |
| alpha methyl styrene | 5 |
| ethyl acrylate | 4 |
| 2-ethyl hexyl acrylate | 5 |
| methyl methacrylate | 33 |
| hydroxypropylacrylate | 5 | and (2) that the composition of the anhydride-functional, carboxy-functional copolymer is as follows:

| Reactants | Percentage By Weight |
|---|---|
| maleic anhydride | 8 |
| methacrylic acid | 6 |
| butyl methacrylate | 45 |
| butyl acrylate | 2 |
| styrene | 5 |
| vinyl toluene | 2 |
| methyl methacrylate | 32 |

The coatings after curing on steel panels demonstrate good appearance.

EXAMPLE 10

The procedure of Example 1 is repeated except for the differences that (1) t-butyl styrene is substituted for the styrene in the preparation of the epoxy-functional, hydroxy-functional copolymer.

The coatings after curing on steel panels demonstrate good appearance.

EXAMPLE 11

The procedure of Example 1 is repeated except for the differences that poly (lauryl acrylate) having $M_n$ of 10,000 is substituted for the poly (2-ethylhexyl acrylate) and (2) is employed in an amount equal to 0.05 weight percent of the powder mixture. The coatings prepared from this powder and cured on steel substrates demonstrate good appearance.

EXAMPLE 12

The procedure of Example 1 is repeated with the differences that (1) an ester of polyethyleneglycol of molecular weight of 3000 and perfluoro octanoic acid is substituted for the poly (2-ethylhexyl acrylate) and (2) is employed in an amount equal to 1 weight percent of the powder mixture. The coatings prepared from this powder and cured on steel substrates demonstrate excellent appearance.

EXAMPLE 13

The procedure of Example 1 is repeated with the differences that poly (methyl phenyl siloxane) having molecular weight of 5,000 is substituted for the poly (2-ethylhexylacrylate) and (2) is employed in an amount equal to 2 weight percent of the powder mixture. The coatings prepared from this powder and cured on steel substrates demonstrate excellent appearance.

EXAMPLE 14

The procedure of Example 1 is repeated except for the differences that (1) poly (isodecyl methacrylate) having molecular weight of 10,000 is substituted for the poly (2-ethylhexyl acrylate) and (2) is employed in an amount equal to 4 weight percent of the powder mixture. The coatings prepared from this powder and cured on steel substrates demonstrate good appearance.

EXAMPLE 15

The procedure of Example 13 is repeated except for the difference that poly (butyl acrylate) is substituted for the poly (2-ethylhexyl acrylate). The coatings prepared from this powder and cured on steel substrates demonstrate good appearance.

EXAMPLE 16

A powder coating composition is prepared, applied, and cured in accordance with Example 1 with the following difference:

The epoxy-functional, hydroxy-copolymer is prepared from the below listed components:

| Reactants | Percentage By Weight |
|---|---|
| glycidyl methacrylate | 15 |
| glycidyl acrylate | 5 |
| butyl methacrylate | 40 |
| styrene | 5 |
| methyl methacrylate | 33 |
| hydroxyethyl methacrylate | 5 |

Many modifications of these examples will be apparent to those skilled in the art in view of this specification. It is intended that all such modifications which fall within the scope of this invention be included within the appended claims.

We claim:

1. In a thermosettable powder paint which exclusive of pigments, antistatic agents, and plasticizers, the same being conventional non-reactive additives to a thermosettable powder paint, consists essentially of a coreactable particulate mixture of 1. an epoxy-functional copolymer of monoethylenically unsaturated monomers having a glass transition temperature in the range of 40°C. to 90°C.,
2. a carboxy-functional compound as crosslinking agent for said copolymer, and
3. 0.05 to 4.0 weight percent of a non-reactive polymeric flow control agent based on the weight of said coreactable particulate mixture, the improvement wherein:

A. said copolymer is a difunctional copolymer of about 5 to about 20 weight percent of a glycidyl ester of a monoethylenically unsaturated carboxylic acid, about 2 to about 10 weight percent of an alpha-beta olefinically unsaturated amide, and about 70 to about 93 weight percent monoethylenically unsaturated monomers consisting essentially of monofunctional monomers selected from the group consisting of esters of a $C_1 - C_8$ monohydric alcohol and acrylic acid, esters of a $C_1 - C_8$ monohydric alcohol and methacrylic acid and $C_8 - C_{12}$ monovinyl hydrocarbons, and has average molecular weight in the range of about 1500 to about 15,000, and B. said carboxy-functional compound is a difunctional copolymer of about 5 to about 20 weight percent of an alpha-beta olefinically unsaturated monocarboxylic acid, about 2 to about 10 weight percent of a monohydroxy ester of a $C_2 - C_4$ diol and acrylic or methacrylic acid, and about 70 to about 93 weight percent monoethylenically unsaturated monomers consisting essentially of monofunctional monomers selected from the group consisting of esters of a $C_1 - C_8$ monohydric alcohol and acrylic acid, esters of a $C_1 - C_8$ monohydric alcohol and methacrylic acid, and $C_8 - C_{12}$ monovinyl hydrocarbons, and has average molecular weight in the range of about 1500 to about 15,000, said carboxy-functional compound being present in an amount such that the functional group of greatest concentration thereon provides about 0.3 to about 1.2 functional groups per functional group on said epoxy-functional copolymer that is reactive with said carboxy-functional compound and such that the functional group of second greatest concentration on said carboxy-functional compound provides about 0.1 to about 0.4 functional groups per functional group on said epoxy-functional copolymer that is reactable with said carboxy-functional compound.

* * * * *